United States Patent
Ghesla et al.

(12) 
(10) Patent No.: US 6,383,013 B1
(45) Date of Patent: May 7, 2002

(54) DISPLAY INSTRUMENT WITH A CABLE CLAMPING CLIP

(75) Inventors: Jürgen Ghesla, Hard (AT); Thomas Erben, Eichberg (CH)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/387,755

(22) Filed: Aug. 31, 1999

(30) Foreign Application Priority Data

Sep. 15, 1998 (DE) .......................... 198 42 251

(51) Int. Cl.⁷ .............................................. H01R 11/20
(52) U.S. Cl. .................... 439/417; 439/408; 439/587; 439/521
(58) Field of Search ................ 439/417, 425, 439/736, 408, 409, 99, 44, 734, 735, 138, 722, 874, 587, 521, 271, 278, 279; 200/11

(56) References Cited

U.S. PATENT DOCUMENTS

| | | | |
|---|---|---|---|
| 4,418,978 A | * 12/1983 | Smamir .................... 439/99 R |
| 4,758,536 A | * 7/1988 | Miller et al. ............... 439/138 |
| 5,482,475 A | * 1/1996 | Kawaguchi ................ 439/394 |
| 5,601,448 A | * 2/1997 | Poon ........................... 439/419 |
| 5,722,861 A | * 3/1998 | Wetter ......................... 439/701 |
| 5,934,225 A | * 8/1999 | Williams .................... 119/859 |

FOREIGN PATENT DOCUMENTS

| | | | |
|---|---|---|---|
| DE | DT-257953-2 | * | 6/1974 |
| DE | 2902745 | | 8/1980 |
| DE | 2946281 | | 12/1980 |
| DE | 4127205 | | 2/1983 |
| DE | 8231241 | | 7/1983 |
| DE | 3525863 | | 1/1987 |
| DE | 3828910 | | 3/1990 |
| DE | 4204164 | | 8/1993 |
| DE | 19630352 | | 1/1998 |

* cited by examiner

*Primary Examiner*—Gary Paumen
*Assistant Examiner*—James R. Harvey
(74) *Attorney, Agent, or Firm*—Martin A. Farber

(57) ABSTRACT

A display instrument has a housing (1) with a base plate (3), on which a cable receptacle (5) is molded. In the region of the cable receptacle (5), contact pins (8) molded into the base plate (3) protrude with contact tips out of it. A clamping clip (17) is able to be swivelled over a flat cable (6) inserted into the cable receptacle (5), in such a way that the contact tips (21) penetrate into individual wires (7) of the flat cable (6) and thereby establish the contacting of the display instrument.

17 Claims, 2 Drawing Sheets

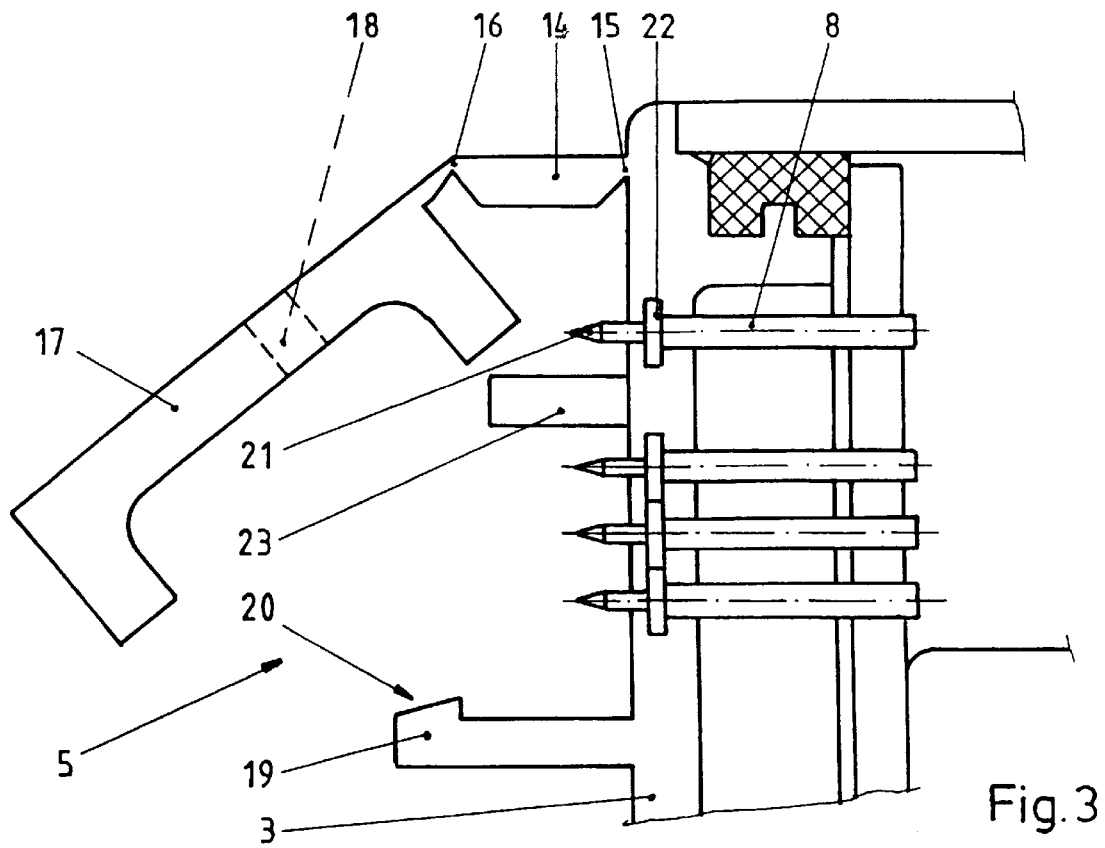
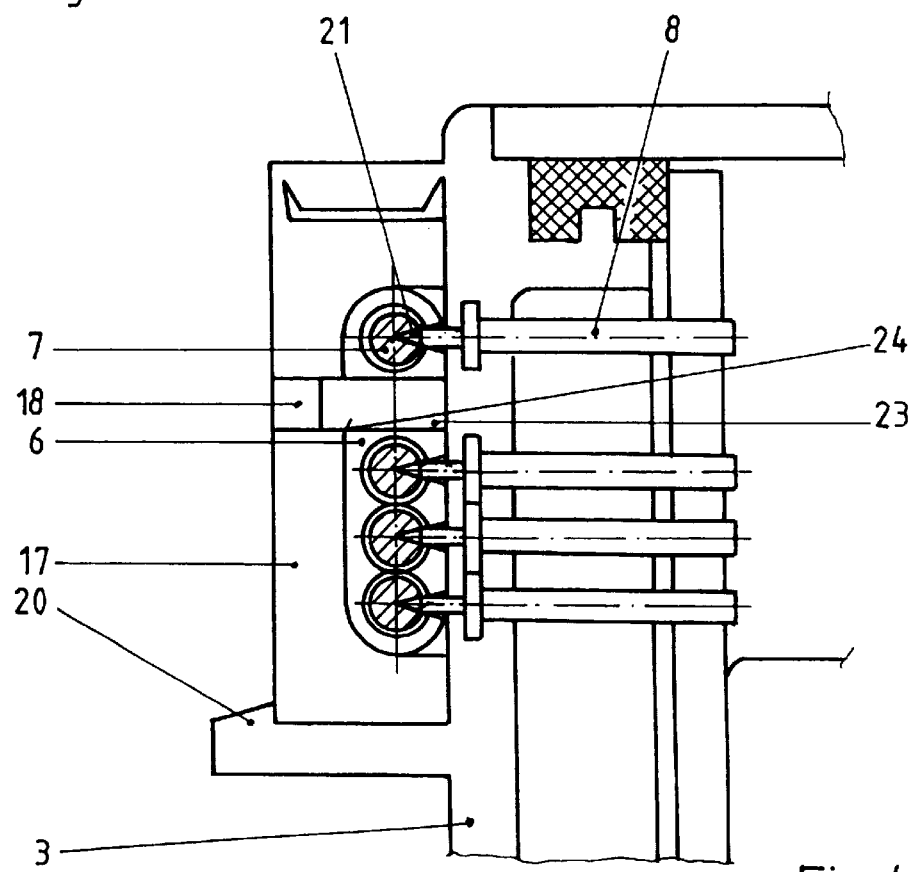

DISPLAY INSTRUMENT WITH A CABLE CLAMPING CLIP

FIELD AND BACKGROUND OF THE INVENTION

The invention relates to a display instrument, in particular for a vehicle, having a housing which has a connection for a connection cable comprising a plurality of individual wires.

Such display instruments are provided in the dashboard of, for example, modern motor vehicles and watercraft and are generally known. They usually have on the rear side a connector receptacle, into which a connector of a connection cable is inserted for the contacting of the display instrument following installation of the respective display instrument. In motor vehicles, and even more so in ships, there is the risk that moisture can penetrate into the display instrument via such connector receptacles, built into the housing of a display instrument, and via the plug-in connection itself. Therefore, a cable length is often led out of the housing of such a display instrument in a sealing manner and is connected to a connection cable only outside the display instrument. This type of contacting likewise entails the risk that moisture can penetrate into the display instrument in the region of the cable bushing, in particular whenever the seal of the cable bushing has not been properly fitted or whenever tensile forces act on the cable length.

SUMMARY OF THE INVENTION

The invention is based on the problem of providing a display instrument of the type stated at the beginning in such a way that simplest possible contacting is possible without the risk of moisture penetrating into the display instrument arising.

This problem is solved according to the invention by a cable receptacle for a flat cable, as the connection cable, being arranged on the outside of the housing and by the housing having contact pins which are molded into it and protrude outward with contact tips from the housing into the cable receptacle.

In the case of such a display instrument, the housing can be made completely impervious without the use of seals on account of the encapsulated contact pins. Even tensile forces acting on the display instrument via the flat cable cannot lead to instances of unimperviousness, because no bores or clearances to be closed by seals are required in the housing for leading through the cable or the contact pins. The display instrument according to the invention is particularly well suited if the flat cable is a data bus line. In such cases, until now the respective display instruments had to have an input and an output. The "tapping" according to the invention of the individual wires of the cable by means of the contact tips allows a data bus line to be connected to the respective display instrument without the continuing data bus line being interrupted. A further advantage of the display instrument according to the invention is that the insulation of the individual wires of a flat cable provides a seal between the contact pins and the flat cable, with the result that no moisture can penetrate into the flat cable through the contacting.

A particularly advantageous development of the invention is that the housing has a base plate, closing the latter at the rear, and the cable receptacle is provided with the contact pins on the base plate. This embodiment is particularly simple to manufacture, because the base plate with the contact pins and the cable receptacle can be produced as a relatively simple injection molding in an injection mold.

The contact pins are held particularly firmly in the display instrument, without any major expenditure being required for this purpose, if a printed circuit board is arranged approximately parallel to the base plate in the interior of the housing and if the contact pins penetrate through the printed circuit board. By this type of design, the contact pins are fixed close to the two ends, on the one hand by the base plate, on the other hand by the printed circuit board. They therefore do not tend to break out from the base plate.

For the electrical connection of the contact pins and the printed circuit board, it is conceivable to use, for example, a clamped connection.

The contacting between the contact pins and the printed circuit board may, however, advantageously take place in a conventional and simple way with devices that are customarily present if the contact pins are soldered to the printed circuit board.

The flat cable can be pressed particularly easily onto the contact tips and held in the pressed-on position if the cable receptacle has a clamping clip which can be moved over the flat cable and presses the latter onto the contact tips.

The clamping clip could be held on the flat cable by one or two screw connections. The connection of the display instrument to the flat cable is possible particularly quickly if the cable receptacle has snap-in means for the snap-in engagement of the clamping clip in a closed position, clamping the flat cable.

A particularly secure and positionally accurate fixing of the clamping clip on the cable receptacle can be achieved if the clamping clip has a positioning bore and the cable receptacle has a corresponding positioning pin, gripping into the positioning bore when the clamping clip is closed.

Fitting mistakes caused by pole reversal of the connection cable can be excluded if the positioning pin of the cable receptacle can engage in a corresponding clearance of the flat cable. Such an embodiment additionally has the advantage that, when exchanging a display instrument, the contact tips inevitably go exactly into the holes left behind in the flat cable by the contact tips of the original display instrument. As a result, the flat cable is not left with any uninsulated regions.

It helps to minimize further the manufacturing costs of the display instrument according to the invention if the clamping clip is connected to the base plate in such a way that it can swivel by means of a film hinge.

The positioning pin can grip into the positioning bore without undesirably great backlash from the outset if the film hinge is molded onto a support which is aligned transversely to the plane of the base plate and for its part is in connection with the base plate by means of a further film hinge, because a displacement of the clamping clip is then possible without movement in the plane of the base plate.

BRIEF DESCRIPTION OF THE DRAWINGS

The invention allows various embodiments. To illustrate its basic principle further, one of these is described below and is represented in the drawings, in which:

FIG. 3 shows a stylized section on an enlarged scale in comparison with FIG. 1 through a contacting region of the display instrument, without a fitted flat cable, and FIG. 4 shows a stylized representation corresponding to FIG. 3 with a fitted flat cable.

DETAILED DESCRIPTION OF THE PREFERRED EMBODIMENT

Figure 1:
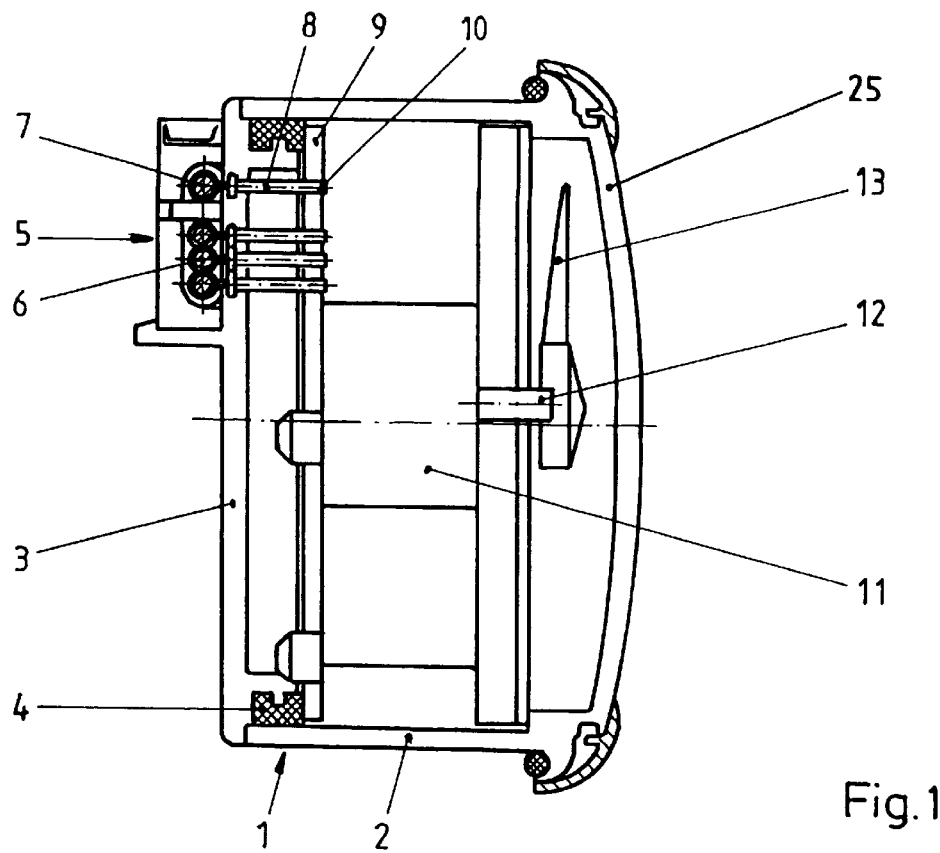
FIG. 1 shows a stylized vertical section through a display instrument according to the invention.

The display instrument represented in its entirety in FIG. 1 has a housing 1, which is formed by a cylindrical shell part 2, connected to a top plate 25 and forming a single component, and a base plate 3. This base plate 3 is sealed off with respect to the shell part 2 by a circumferential seal 4. Molded onto the base plate 3 on the outside is a cable receptacle 5 for a flat cable 6, which has a plurality of individually insulated individual wires 7. The contacting of these individual wires 7 takes place by contact pins 8, which were molded into the base plate 3 during its manufacture. The contact pins 8 penetrate through a printed circuit board 9 and are in electrical connection with conductor tracks (not shown) on the printed circuit board 9 by soldered connections 10.

FIG. 1 additionally shows a pointer drive 11, which drives a pointer spindle 12 with a pointer 13.

Figure 2:
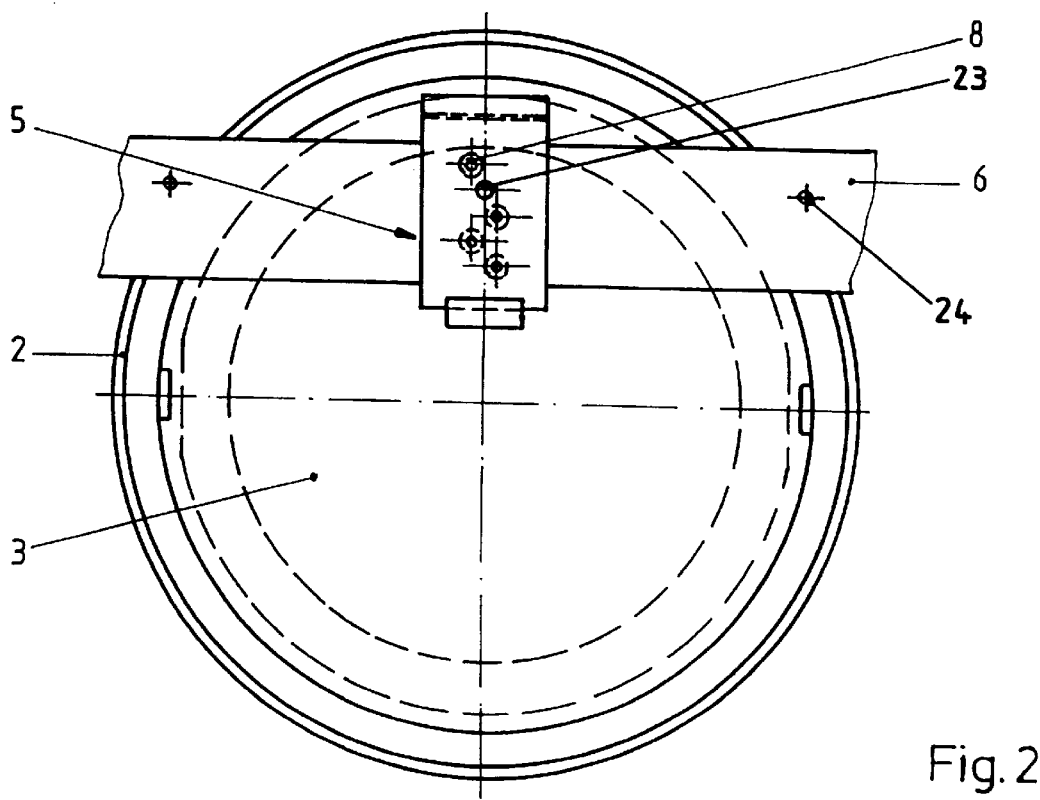
FIG. 2 shows a stylized view of the rear side of the display instrument.

FIG. 2 reveals that the flat cable 6 is a data bus line, which is led past the display instrument and is merely "tapped" by the contact pins 8 in the region of the cable receptacle 5. Furthermore, it can be seen in FIG. 2 that the contact pins 8 are offset with respect to one another, with the result that they can be arranged particularly close together.

FIG. 3 illustrates the type of design of the cable receptacle 5. It can be seen that on the base plate 3 there is molded, by means of a film hinge 15, a support 14 extending outwardly at right angles away from it. Connected to this support 14, by means of a film hinge 16, is a clamping clip 17, which has a positioning bore 18. The base plate 3 has on the side of the cable receptacle 5 lying opposite the support 14 a web 19 with a snap-in means 20, designed as a snap-in lug.

The contact pins 8 in each case have a contact tip 21. Within the material of the base plate 3, a flange 22 on each contact pin 8 in each case ensures that the latter is able to transmit relatively high forces in the axial direction. In the region of the cable receptacle 5, a positioning pin 23 protrudes outwardly from the base plate 3. This positioning pin 23 grips into the positioning bore 18 when the clamping clip 17 is closed.

FIG. 4 shows the clamping clip 17 in the closed state, in which the snap-in means 20, designed as a snap-in lug, grips over the clamping clip 17 and, as a result, keeps it closed. In the contacted position shown of the display instrument, the contact tips 21 of the contact pins 8 have penetrated into the respective individual wire 7, without penetrating completely through it however, whereby the display instrument is electrically connected without the flat cable 6 having to be severed for this purpose. If the display instrument is separated from the flat cable 6, the same or another display instrument can later be connected to the flat cable 6 only in the same position, because the positioning pin 23 has to penetrate through a corresponding hole 24 in the flat cable 6 for this purpose. The enforced fixed position ensures that the contact tips 21 inevitably penetrate into the holes in the flat cable 6 originally produced by them.

As FIG. 2 reveals, the flat cable 6 is provided at fixed intervals with clearances 24, which are moreover arranged off-center (see also FIG. 4). In this way it is ensured that the flat cable 6 can be fitted in the cable receptacle 5 only in a predetermined installation position with respect to the assignment of its individual wires 7 to corresponding contact pins 8.

We claim:

1. A display instrument, suitable for use in a vehicle, having a housing which has a connection for a connection cable comprising a plurality of individual wires;

the housing comprising a shell with a base plate that positions the connection onto the housing;

the housing with the connection being impervious to outside moisture, wherein a cable receptacle for a flat cable, as the connection cable, is arranged on the outside of the housing and wherein the housing has contact pins which are molded into it and protrude outward with contact tips from the housing into the cable receptacle;

there being a seal along an interface between a parameter of the base plate and the shell of the housing.

2. The display instrument as claimed in claim 1, wherein the base plate closes the housing at the rear, and the cable receptacle is provided with the contact pins on the base plate.

3. The display instrument as claimed in claim 1, wherein the cable receptacle has a clamping clip which, upon insertion of the flat cable into the cable receptacle, is movable over the flat cable and presses the cable onto the contact tips.

4. The display instrument as claimed in claim 3, wherein the cable receptacle has snap-in means for snap-in engagement of the clamping clip in a closed position, clamping the flat cable.

5. The display instrument as claimed in claim 3, wherein the base plate closes the housing at the rear, and the clamping clip is connected to the base plate in such a way that it can swivel by means of a film hinge.

6. A display instrument, suitable for use in a vehicle, comprising:

a housing which has a connection for a flat connection cable having a plurality of individual wires;

the housing comprising a shell with a base plate that positions the connection onto the housing;

a cable receptacle for reception of the flat cable, and being located on the outside of the housing; and contact pins molded into the housing and having contact tips protruding outward from the housing into the cable receptacle;

wherein the base plate closes the housing at the rear, the contact pins being located on the base plate at the cable receptacle; and a printed circuit board is arranged approximately parallel to the base plate in the interior of the housing and wherein the contact pins penetrate through the printed circuit board;

there being a seal along an interface between a parameter of the base plate and the shell of the housing.

7. The display instrument as claimed in claim 6, wherein the contact pins are soldered to the printed circuit board.

8. A display instrument, suitable for use in a vehicle, comprising:

a housing which has a connection for a flat connection cable having a plurality of individual wires;

the housing comprising a shell with a base plate that positions the connection onto the housing;

a cable receptacle for reception of the flat cable, and being located on the outside of the housing; and contact pins molded into the housing and having contact tips protruding outward from the housing into the cable receptacle;

wherein the cable receptacle has a clamping clip which, upon insertion of the flat cable into the cable receptacle, is movable over the flat cable and presses the cable onto the contact tips; and the clamping clip has a positioning bore, and the cable receptacle has a corresponding positioning pin, gripping into the positioning bore when the clamping clip is closed, the positioning pin passing between two of the wires of the flat cable upon insertion of the flat cable within the cable receptacle, and the positioning pin serving to align the flat connection cable with the display instrument to permit replacement of the display instrument with a further display instrument;

there being a seal along an interface between a parameter of the base plate and the shell of the housing.

9. The display instrument as claimed in claim 8, wherein the positioning pin of the cable receptacle can engage in a corresponding clearance of the flat cable.

10. A display instrument, suitable for use in a vehicle, comprising:

a housing which has a connection for a flat connection cable having a plurality of individual wires;

the housing comprising a shell with a base plate that positions the connection onto the housing;

a cable receptacle for reception of the flat cable, and being located on the outside of the housing; and contact pins molded into the housing and having contact tips protruding outward from the housing into the cable receptacle;

wherein the housing has a base plate closing the housing at the rear, and the cable receptacle has a clamping clip which, upon insertion of the flat cable into the cable receptacle, is movable over the flat cable and presses the cable onto the contact tips;

the clamping clip is connected to the base plate in such a way that it can swivel by means of a film hinge; and the film hinge is molded onto a support which is aligned transversely to a plane of the base plate and is in connection with the base plate by means of a further film hinge;

there being a seal along an interface between a parameter of the base plate and the shell of the housing.

11. A display instrument, suitable for use in a vehicle, comprising:

a housing which has a connection for a flat connection cable having a plurality of individual wires;

there being a seal along an interface between a parameter of the base plate and the shell of the housing.

a cable receptacle for reception of the flat cable, and being located on the outside of the housing; and contact pins molded into the housing and having contact tips protruding outward from the housing into the cable receptacle;

a positioning pin extending within the cable receptacle;

wherein the cable receptacle has a clamping clip which, upon insertion of the flat cable into the cable receptacle, is movable over the flat cable and presses the cable onto the contact tips; and the positioning pin serves to align both the cable and the clip;

there being a seal along an interface between a parameter of the base plate and the shell of the housing.

12. A display instrument having a housing for connection with a flat cable comprising a plurality of individual wires, the housing being impervious to outside moisture, the display instrument being suitable for use in a vehicle and further comprising:

a cable receptacle for the flat cable, the cable receptacle being disposed on an outside of the housing;

the housing comprising a shell with a base plate that positions the connection onto the housing;

contact pins molded into the housing and having contact tips protruding outward from the housing into the cable receptacle for contacting respective wires of the cable for making electrical contact therewith upon insertion of the flat cable within the cable receptacle, protrusion of the tips of the contact pins through insulation of respective ones of the wires inhibiting an entry of humidity into regions of contact between the contact pins and respective ones of the wires of the flat cable to maintain integrity of electrical connection between each of the contact pins and its respective wire;

a printed circuit board located within the housing and making electrical contact with the contact pins; and a positioning pin disposed within the cable receptacle and being located for passing between two of the wires of the flat cable upon insertion of the flat cable within the cable receptacle, said positioning pin piercing the flat cable to provide therein an aperture for alignment of the flat cable with the contact pins upon connection of the display instrument to the flat cable;

there being a seal along an interface between a parameter of the base plate and the shell of the housing.

13. The display instrument as claimed in claim 12, further comprising a clamping clip and a film hinge assembly securing the clip to the housing, the clip serving to secure the flat cable within the cable receptacle.

14. The display instrument as claimed in claim 13, further comprising snap-in means for snap-in engagement of the clamping clip about the flat cable, upon insertion of the flat cable within the cable receptacle.

15. The display instrument as claimed in claim 13, wherein the clamping clip has a bore for receiving the positioning pin upon engagement of the clamping clip about the flat cable during insertion of the flat cable within the cable receptacle.

16. The display instrument as claimed in claim 13, wherein the connection between each of said contact pins and the housing includes means for resisting a force of the clamping clip against the cable and the contact pins to prevent a driving of the contact pins against the printed circuit board.

17. The display instrument as claimed in claim 16, wherein the force resisting means comprises flanges disposed on respective ones of the contact pins, the flanges being molded into a base of the housing.

* * * * *